United States Patent [19]

Garrison, Jr.

[11] Patent Number: 4,708,980

[45] Date of Patent: Nov. 24, 1987

[54] FLAME RETARDANT POLYETHYLENE TEREPHTHALATE

[75] Inventor: William E. Garrison, Jr., Wilmington, Del.

[73] Assignee: E. I. Du Pont de Nemours and Company, Wilmington, Del.

[21] Appl. No.: 941,791

[22] Filed: Dec. 15, 1986

Related U.S. Application Data

[63] Continuation-in-part of Ser. No. 935,384, Nov. 26, 1986.

[51] Int. Cl.$^4$ ............................ C08K 5/03; C08K 3/22
[52] U.S. Cl. ..................................... 524/412; 523/351; 524/411; 525/166
[58] Field of Search ............... 524/409, 411, 410, 412, 524/606; 525/166; 523/351

[56] References Cited

U.S. PATENT DOCUMENTS

| | | | |
|---|---|---|---|
| 4,205,142 | 5/1980 | Baer | 525/166 |
| 4,254,242 | 3/1981 | Kyo | 524/392 |
| 4,268,432 | 5/1981 | Maslen et al. | 260/45.75 |
| 4,278,769 | 7/1981 | Gebauer et al. | 521/90 |
| 4,325,865 | 4/1982 | Baer | 523/205 |
| 4,339,556 | 7/1982 | Baer | 523/220 |
| 4,429,067 | 1/1984 | Barenberg | 524/605 |
| 4,496,681 | 1/1985 | Lordi | 524/371 |
| 4,524,191 | 6/1985 | Nakamura et al. | 524/605 |
| 4,525,513 | 6/1985 | Hochberg et al. | 524/412 |

FOREIGN PATENT DOCUMENTS

| | | |
|---|---|---|
| 852102 | 1/1977 | Belgium . |
| 861643 | 6/1978 | Belgium . |
| 2514 | 6/1979 | European Pat. Off. . |
| 41315 | 12/1981 | European Pat. Off. . |
| 78646 | 6/1975 | Japan . |
| 87444 | 7/1975 | Japan . |
| 87445 | 7/1975 | Japan . |

*Primary Examiner*—Veronica P. Hoke

[57] ABSTRACT

If antimony oxide is added to a blend of polyethylene terephthalate/alkali metal organic carboxylate in the form of a concentrate in a polyamide, the destabilizing effect of the antimony oxide on the blend is minimized. This greatly improves the thermal stability of the polyethylene terephthalate blend during compounding and subsequent melt processing operations, as compared with similar compositions where the antimony oxide is added in the form of a concentrate with another organic polymer, viz., polyethylene, or is added neat.

7 Claims, No Drawings

FLAME RETARDANT POLYETHYLENE TEREPHTHALATE

CROSS REFERENCE TO RELATED APPLICATION

This application is a continuation-in-part of application Ser. No. 935,384, filed Nov. 26 1986.

FIELD OF THE INVENTION

This invention relates to polyethylene terephthalate molding blends, and more specifically to such blends that may be molded to obtain shaped articles of improved flame retardancy.

BACKGROUND OF THE INVENTION

Polyethylene terephthalate is a low cost polymer but until recently it had not been accepted as a good molding resin for a number of reasons. For example, certain alkali metal salts of organic carboxy containing compositions (alkali metal organic carboxylates) are commonly added to promote crystallization by enhancing nucleation of the polyethylene terephthalate. In addition, polyethylene terephthalate is commonly flame retarded by adding common flame retardants such as halogenated organic compounds and an antimony oxide synergist. But, when flame retardant systems containing an antimony oxide synergist are added to a blend of polyethylene terephthalate and alkali metal organic carboxylates, the polymer is degraded, resulting in a deterioration of mechanical properties and a decrease in melt viscosity. This deterioration when antimony oxide is present is particularly unfortunate since antimony oxide is a particularly good synergist for halogenated aromatic organic flame retardants. It is readily available, is low cost, and is highly effective. In contrast, many other inorganic synergists are simply not effective in polyethylene terephthalate flame retardant systems or degrade the resin when used with polyethylene terephthalate, some of these being zinc oxide, zinc sulfide, zinc borate, stannous oxide, molybdenum oxide and molybdates.

A flame retardant system using antimony oxide which, when added to the blend of polyethylene terephthalate and alkali metal organic carboxylates, would not substantially affect the thermal stability of the polyethylene terephthalate is desirable, and is provided by this invention.

SUMMARY OF THE INVENTION

It has now been discovered that if the antimony oxide is added in the form of a concentrate in a polyamide, the destabilizing effect of the antimony oxide on the blend of alkali metal organic carboxylates and polyethylene terephthalate is minimized. This greatly improves the thermal stability of the polyethylene terephthalate during compounding and subsequent melt processing operations, such as injection molding, as compared with similar compositions where the antimony oxide is added in the form of a concentrate with another organic polymer, viz., polyethylene, or is added neat.

Specifically, the polyethylene terephthalate molding blends of this invention are defined as (a) 20–90% by weight of blend of polyethylene terephthalate having an inherent viscosity of at least 0.4, (b) 0.1–20% by weight of blend of (a) and (b) of at least one sodium and/or potassium salt of a carboxyl containing organic composition selected from the class consisting of hydrocarbon monocarboxylic acids containing 7–25 carbon atoms, hydrocarbon di- or tricarboxylic acids of 7–54 carbon atoms, and organic carboxyl containing polymers, (c) a halogenated flame retardant consisting of an aromatic organic compound having at least one aromatic ring in which the compound has sufficient halogen bonded directly to aromatic ring carbons to provide flame retardant properties, said flame retardant present in said blend in an amount sufficient to provide an amount of halogen to the blend of between about 5 and 30% by weight based on weight of blend of (a) and (c), (d) 0.3–8% by weight of blend based on weight of (a) and (d) of antimony oxide, said antimony oxide being added to the blend in the form of a concentrate in polyamide.

Usually the blend will contain up to 0–55% by weight of blend of a reinforcing or filling material.

DESCRIPTION OF THE INVENTION

The Polyethylene Tereohthalate

The polyethylene terephthalate employed herein is one which has an inherent viscosity of at least 0.4 as measured by ASTM D-2857. It preferably has an upper limit on inherent viscosity of about 1.2. Inherent viscosity is measured at a concentration of 0.50 g per 100 ml in a 3:1 by volume ratio of methylene chloride and trifluoroacetic acid at 30° C. The polyethylene terephthalate can contain up to 50% by weight of other comonomers such as diethylene glycol, glutaric acid, 1,4-butanediol, polyalkylene oxide, cyclohexane dimethanol, and other diols. Preferably the polyethylene terephthalate is present in an amount between 35 and 70% by weight of blend.

The Reinforcing or Filler Material

The reinforcing or filler material which may be employed herein includes glass fibers, graphite fibers, aramid fibers, glass beads, aluminum silicate, asbestos, mica, and the like, and combinations of them. The material is preferably present in an amount of between 15 and 55 percent by weight of blend.

Alkali Metal Organic Carboxylates

Representative of the salts of the organic carboxylates are ionic hydrocarbon copolymers (ionomer resin hereafter) of an alpha-olefin of 2–5 carbon atoms, and an alpha,beta- ethylenically unsaturated carboxylic acid of 3–5 carbon atoms in which the carboxyl groups have been at least partially neutralized with sodium and/or potassium cations, for example, copolymers of ethylene and acrylic or methacrylic acid. Preferably these copolymers are the sodium or potassium salt of ethylene/methacrylic acid copolymers (preferably 30–95% neutralized). Representative also is the sodium salt of styrene/maleic anhydride copolymers (including both wholly or partially neutralized salts, e.g., at least about 30% neutralized). The olefin moiety ordinarily comprises 50–98% by weight of the copolymer, and preferably 80–98%. An especially preferred material is the sodium salt of ethylene/methacrylic acid copolymer. The copolymers may be prepared by conventional high pressure polymerization technology.

Another class is the salts of substantially aliphatic di- or tri- carboxylic acids containing at least 7, preferably at least 26 carbon atoms, and more preferably 30 to 54 carbon atoms, and having a molecular weight of less than about 1500, preferably between 450–1000. These salts are present in the blends in an amount of between about 0.1–5 percent by weight, preferably between 0.35–1.1%, based on polyethylene terephthalate. Although both saturated and unsaturated polycarboxylic acids can be used to form the salt, saturated acids are preferred because they have less tendency to discolor. In addition, the acids may contain aryl moieties in the aliphatic chain, as for example, phenylene. Representative substantially aliphatic polycarboxylic acids that can be used to make the salts useful in this invention include dimer acid, and trimer acid. By dimer acid is meant the $C_{36}$ dicarboxylic acid which is obtained by the dimerization of $C_{18}$ fatty acids. By trimer acid is meant the $C_{54}$ tricarboxylic acid which is obtained by the trimerization of $C_{18}$ fatty acids.

The Halogenated Flame Retardant

The halogenated flame retardant consists of an aromatic compound which contains halogen, preferably bromine or chlorine atoms, attached directly to the aromatic ring or rings. The bromine content, when bromine is present, is at least 25% of the weight of the compound; and the chlorine content, when chlorine is present, is at least 40% of the weight of the compound. In addition, the flame retardant compound should be substantially stable at up to 300° C. and should not cause degradation of polyethylene terephthalate. When the compound contains bromine, the amount of the bromine present in the blend should preferably be between 5–20% by weight of blend with component (a) alone. When the compound contains chlorine, the amount of the chlorine present should preferably be between 5–20% by weight of blend with component (a) alone.

Representative flame retardants include decabromodiphenyl ether, octabromodiphenyl ether, ethylene bis-(tetrabromophthalimide), brominated polystyrene, poly(dibromophenylene oxide), and analogous chlorinated compounds and the like. Polymeric retardants may have a molecular weight up to 200,000 or more.

Antimony Oxide

The antimony oxide ($Sb_2O_3$ or $Sb_2O_5$) used herein is added as a concentrate in a polyamide. It may be used with the polyamide in solid or particulate form. Preferably it will be present in the polyethylene terephthalate blend in an amount of between 0.3 and 5% by weight of blend with component (a) alone, and most preferably between 0.3 and 1%. Preferably the antimony oxide will be 20–80% of the concentrate.

The polyamides useful as a carrier for the antimony oxide are well known in the art. They are of film-forming molecular weight. The polyamide resin can be produced by condensation of equimolar amounts of a saturated organic dicarboxylic acid containing from 4–12 carbon atoms with an organic diamine containing 2–13 carbon atoms, in which the diamine can be employed, if desired, to provide an excess of amine end groups over carboxyl end groups in the polyamide. Vice versa, the diacid can be used to provide an excess of acid groups. Equally well, these polyamides may be made from acid-forming and amine-forming derivatives of said amines and acids such as esters, acid chlorides, amine salts, etc. Representative dicarboxylic acids used to make the polyamides include adipic acid, pimelic acid, suberic acid, sebacic acid, and dodecanedioic acid, while representative diamines include hexamethylenediamine and octamethylenediamine. In addition, the polyamide can also be prepared from self-condensation of an $\omega$-aminocarboxylic acid or a lactam. Examples of polyamides include poly(hexamethylene adipamide) (66 nylon), poly(hexamethylene azelaamide) (69 nylon), poly(hexamethylene sebacamide) (610 nylon), and poly(hexamethylene dodecanoamide) (612 nylon), poly(4,4,'-methylenedicyclohexylene dodecanoamide), or the polyamides produced by ring opening of lactams; i.e., polycaprolactam (6 nylon), polylaurylactam (12 nylon) or, poly-11-aminoundecanoamide which is made from an $\omega$-amino acid. It is also possible to use polyamide copolymers prepared by the polymerization of at least two of the amines or acids used to prepare the above polymers, as for example, a polymer made of adipic acid, iosphthalic acid and hexamethylene diamine; or a copolymer of hexamethylene diamine, adipic acid and caprolactam. Blends of polyamides, such as a mixture of 66 nylon and 6 nylon are also included.

Other Additives

In addition to the components discussed hereinabove, the blends of this invention may contain additives commonly employed with polyester resins, such as colorants, mold release agents, antioxidants, tougheners, nucleating agents, ultraviolet light and heat stabilizers and the like.

A preferred additive is a selected low molecular weight organic plasticizer compound that is an ester, ketone, sulfone, sulfoxide, nitrile, amide or sulfonamide. It has recently been found that polyethylene terephthalate articles of good quality can be obtained by molding at lower temperatures, e.g., 80°–100° C., if these low molecular weight materials are employed with the ionic hydrocarbon copolymers or with nucleating agents. These additive materials increase the rate of crystallization, and molded articles having smooth glossy surfaces that are easily removable from molds, are obtained when the materials are employed. These additives, when used, will preferably be present in amounts of 1–12% by weight of blend.

Additionally, any of the usual nucleating agents for polyethylene terephthalate can be employed, such as inorganic oxides or carbonates, other salts of carboxylic acids or sodium/polyethylene terephthalate oligomer.

Preparation

The blends of this invention are prepared by melt compounding the components together by any convenient means to obtain an intimate blend. Neither temperature nor pressure is critical. For example, the polyethylene terephthalate can be mixed dry in any suitable blends or tumbled with the other components and the mixture melt-extruded. The extrudate can be chopped. If desired, the reinforcing or filling agent can be omitted initially and added after the first melt extrusion, and the resulting mixture can then be melt extruded.

EXPERIMENTS AND EXAMPLES

In the Experiments and Examples which follow, percents are based on total blend unless otherwise noted.

Properties of molded test bars were measured according to the following procedures:

Tensile strength and elongation were measured by ASTM Method D638 on injection molded bars at a strain rate of 0.2 inch per minute.

Unnotched impact strength was measured by ASTM D256 without notching the bars. For this test on all samples and for tensile strength and elongation of Examples 1 and 2, the bars were annealed for 16 hours in nitrogen at 150° C.

Melt viscosity of the extruded pellets was measured on a Monsanto Automatic Capillary Rheometer equipped with a 0.0305" diameter×0.62" long cylindrical orifice at a constant shear stress of 125 KPa. The pellets were dried for 16 hours about 110° C. in a vacuum oven with nitrogen bleed before testing.

In the Experiments and Examples, the mode of preparation and testing was as follows:

The ingredients were dry blended manually and the resulting mixture was then extruded through a two-stage two-inch single screw extruder at a melt temperature of 285°-300° C. and a vacuum of 25-28 inches. The extruded strand was quenched in water and cut into pellets which were then dried about 95° C. in a dehumidified air oven for 16 hours. The dried pellets were injection molded into test bars using a 6 oz. Van Dorn reciprocating screw machine with a fast ram speed and a mold cavity temperature of about 105° C.

The standard cycle was 33 seconds, representing a holdup time of 3 minutes, at a melt temperature of about 307° C. The severe cycle was 109 seconds, representing a holdup time of 10 minutes, at a melt temperature of about 312° C. Examples 1 and 2, which contained no crystallization promoting additives, were molded at a cavity temperature of about 50° C. and subsequently annealed.

Antimony oxide in nylon 6 (70/30) was obtained from M&T Chemical Co.

Antimony oxide concentrates in other nylon carriers were prepared by compounding dry blends in a 28 mm Werner and Pfleiderer twin screw extruder. The extruded strand was then quenched in water and cut into pellets which were then dried about 95° C. in a dehumidified air oven for 16 hours.

Ingredients used in the Experiments and Examples are listed as follows:

PET - Polyethylene terephthalate homopolymer resin having an inherent viscosity of 0.6 as measured at 30° C. at a concentration of 0.50 g/100 ml in a mixture of 1 part trifluoroacetic acid and 3 parts of dichloromethane. The resin was dried to less than 0.1% water before use.

"Surlyn" 8920 - An alkali metal organic carboxylate, namely, an ionic hydrocarbon copolymer, namely, a copolymer of ethylene and 15% by weight methacrylic acid neutralized approximately 60% with sodium.

"Epon" 1009 - A condensation product of epichlorohydrin and Bisphenol A having a molecular weight of 4000-8000 and approximately 0.53% oxirane oxygen. Obtained from Shell Chemical Company.

"Irganox" 1010 - Tetrakis [methylene(3,5-di-tertbutyl-4-hydroxyhydrocinnamate) methane] from Ciba Geigy.

Brominated Polystyrene - Polystyrene Brominated to contain 68% bromine ("PyroChek" 68PB from Ferro Corporation).

Antimony Oxide - $Sb_2O_3$ ("Thermogard" S from M&T Chemicals).

70% $Sb_2O_3$ in Nylon 6- "T/S" N-6 70/30 from M&T Chemical Co.

90% $Sb_2O_3$ in Polyethylene - "T/S" PE 90/10 from M&T Chemical Co.

Glass Fibers - PPG 3540 1/8" chopped glass fibers.

"Capron" 8200 - Nylon 6 from Allied Chemical Co.

"Ultranox" 626 - bis(2,4-di-t-butylphenyl) pentaerythritol diphosphite from Borg Warner Chemicals.

Sodium Dimerate - Obtained by neutralizing Empol ® 1010 dimer acid with sodium hydroxide.

EXAMPLES 1-3 AND COMPARISONS A-D

These experiments show that the difference in concentrate carriers (nylon vs. polyethylene) is important in compositions containing the alkali metal carboxylates and PET. The experiments show that powdered antimony oxide alone (with no carrier), like antimony oxide in polyethylene, causes more degradation than antimony oxide in the nylon carrier.

All examples contain 1% antimony trioxide, either by itself (powdered) or in a polymeric carrier. Compositions are listed in Table I, and properties in Table II. A comparison of Example 1 and Comparison A shows that antimony oxide in polyethylene gives lower viscosity and somewhat poorer mechanical properties to the alkali metal carboxylate/PET system than does antimony trioxide in Nylon 6.

In a similar composition, use of the nylon carrier (Example 2) gives substantially higher melt viscosity and better mechanical properties, especially after a severe molding cycle, than does powdered antimony trioxide (Comparison B).

In the additional presence of plasticizer (N-octadecyl p-toluene sulfonamide), antimony trioxide in nylon (Example 3) gives higher melt viscosity (therefore less degradation) and superior properties than either antimony trioxide in a polyethylene carrier (Comparison C) or as the pure powder (Comparison D). The effect is most dramatic when bars are molded using a severe cycle.

TABLE I

| COMPOSITION OF EXAMPLES 1-3 AND COMPARISONS A-D | | | | | | | |
|---|---|---|---|---|---|---|---|
| | Ex 1 | Comp A | Ex 2 | Comp B | Ex 3 | Comp C | Comp D |
| PET | 52.1 | 52.4 | 52.1 | 52.4 | 48.6 | 48.9 | 49.0 |
| Brominated Polystyrene | 11.9 | 11.9 | 11.9 | 11.9 | 11.9 | 11.9 | 11.9 |
| N—octadecyl p-toluene sulfonamide (plasticizer) | — | — | — | — | 3.2 | 3.2 | 3.2 |
| "Surlyn" 8920 (ionic hydrocarbon copolymer) | 3.8 | 3.8 | 3.8 | 3.8 | 3.5 | 3.5 | 3.5 |
| Pentaerythritol tetrastearate | — | — | — | — | 0.6 | 0.6 | 0.6 |
| "Epon" 1009F | 0.6 | 0.6 | 0.6 | 0.6 | 0.6 | 0.6 | 0.6 |
| "Irganox" 1010 | 0.2 | 0.2 | 0.2 | 0.2 | 0.2 | 0.2 | 0.2 |
| 70% $Sb_2O_3$ in Nylon 6 | 1.4 | — | 1.4 | — | 1.4 | — | — |

TABLE I-continued

COMPOSITION OF EXAMPLES 1-3 AND COMPARISONS A-D

|  | Ex 1 | Comp A | Ex 2 | Comp B | Ex 3 | Comp C | Comp D |
|---|---|---|---|---|---|---|---|
| 90% $Sb_2O_3$ in Polyethylene | — | 1.1 | — | — | — | 1.1 | — |
| $Sb_2O_3$ (Powdered) | — | — | — | 1.0 | — | — | 1.0 |
| Glass Fibers | 30.0 | 30.0 | 30.0 | 30.0 | 30.0 | 30.0 | 30.0 |

TABLE II

PROPERTIES OF EXAMPLES

|  | Ex 1 | Comp A | Ex 2 | Comp B | $Sb_2O_3$ in Nylon 6 Ex 3 | $Sb_2O_3$ in PE Comp C | $Sb_2O_3$ Neat Comp D |
|---|---|---|---|---|---|---|---|
| Melt Viscosity, Pa.s | 924 | 614 | 933 | 830 | 358 | 238 | 273 |
| Standard Cycle: | | | | | | | |
| Unnotched Impact | 19.2 | 15.7 | 20.1 | 15.6 | 14.6 | 11.5 | 11.7 |
| Tensile Str., Kpsi | 23.5 | 23.0 | 22.8 | 22.7 | 22.5 | 20.9 | 21.8 |
| % Elongation | 2.47 | 2.33 | 2.54 | 2.22 | 2.27 | 2.09 | 2.16 |
| Severe Cycle: | | | | | | | |
| Unnotched Impact | — | — | 14.8 | 9.9 | 11.0 | 6.8 | 8.9 |
| Tensile Str., Kpsi | — | — | 23.0 | 19.4 | 21.0 | 14.8 | 17.8 |
| % Elongation | — | — | 2.24 | 1.64 | 2.06 | 1.46 | 1.66 |

EXAMPLES 4-10 AND COMPARISON E

These experiments contain 11.9% brominated polystyrene, 3.2% N-octadecyl p-toluenesulfonamide, 3.5% of the alkali metal carboxylate used in Examples 1-7 ("Surlyn" 8920), 0.65% pentaerythritol tetrastearate, 0.6% "Epon" 1009F, 0.2% "Irganox" 1010, and 1.0% antimony oxide added as a concentrate in the stated carrier. Examples 4 and 5 and Comparison E also contain 0.2% "Ultranox" 626. The remainder of the compositions is PET.

Although there appear to be differences in the effectiveness of the various nylon carriers, they generally give compositions having higher melt viscosity and better mechanical properties than those obtained with the inert polyethylene carrier.

TABLE III

|  | EXAMPLES 4-6 AND COMPARISON E | | | | EXAMPLES 7-10 | | | |
|---|---|---|---|---|---|---|---|---|
| Example | Comp. E | Ex. 4 | Ex. 5 | Ex. 6 | Ex. 7 | Ex. 8 | Ex. 9 | Ex. 10 |
| Carrier for $Sb_2O_3$ | Poly-Ethylene | "Capron" 8200 (Nylon 6) | "Zytel" 101 (Nylon 66) | "Zytel" 158 (Nylon 612) | HULS (Nylon 12) | "Zytel" 330 (Amorphous) | "Zytel" FE3377 (Amorphous) | "Capron" 8200 (Nylon 6) |
| % $Sb_2O_3$ in Concentrate | 90 | 70 | 50 | 60 | 60 | 60 | 60 | 70 |
| Melt Viscosity, Pa.S | 158 | 280 | 256 | 243 | 248 | 269 | 272 | 261 |
| Standard Cycle: | | | | | | | | |
| Unnotched Impact | 9.0 | 11.9 | 10.0 | 12.3 | 12.5 | 12.3 | 13.4 | 15.5 |
| Tensile Str., Kpsi | 20.0 | 21.1 | 20.0 | 21.8 | 21.5 | 21.3 | 21.8 | 21.7 |
| % Elongation | 1.91 | 2.07 | 1.82 | 2.24 | 2.24 | 2.12 | 2.23 | 2.28 |
| Severe Cycle: | | | | | | | | |
| Unnotched Impact | 6.9 | 8.5 | 7.2 | 5.2 | 5.8 | 7.0 | 9.2 | 7.9 |
| Tensile Str., Kpsi | 15.0 | 17.0 | 15.0 | 11.7 | 13.3 | 15.6 | 16.4 | 16.6 |
| % Elongation | 1.37 | 1.56 | 1.56 | 1.08 | 1.31 | 1.43 | 1.52 | 1.53 |

EXAMPLES 11-14 AND COMPARISONS F AND G

These experiments show that the antimony oxide/polyamide concentrate is effective when the alkai metal carboxylate is sodium dimerate. All experiments contained 1% antimony oxide. Compositions are listed in Table IV along with melt viscosity.

Examples 11 and 12 with Comparisons F and I demonstrate the effectiveness of $Sb_2O_3$ in nylon 6, as opposed to $Sb_2O_3$ neat.

Comparisons G and H show that there is no degradation by antimony oxide when no alkali metal carboxylate is present.

TABLE IV

|  | 11 | F | G | H | 12 | I |
|---|---|---|---|---|---|---|
| PET | 54.6 | 55.0 | 46.3 | 45.9 | 44.9 | 45.3 |
| Brominated Polystyrene | 11.9 | 11.9 | 11.9 | 11.9 | 11.9 | 11.9 |
| Sodium Dimerate | 1.3 | 1.3 | 0 | 0 | 1.0 | 1.0 |
| Ethylene Acrylic Acid Copolymer (Dow 469) | 0 | 0 | 10.0 | 10.0 | 10.0 | 10.0 |
| Epon 1009 | 0.6 | 0.6 | 0.6 | 0.6 | 0.6 | 0.6 |
| Irganox 1010 | 0.2 | 0.2 | 0.2 | 0.2 | 0.2 | 0.2 |
| 70% $Sb_2O_3$ in Nylon-6 | 1.4 | 0 | 0 | 1.4 | 1.4 | 0 |
| $Sb_2O_3$, Neat | 0 | 1.0 | 1.0 | 0 | 0 | 1.0 |
| Glass Fiber | 30 | 30 | 30 | 30 | 30 | 30 |
| Melt Viscosity, Pa.s | 276 | 193 | 432 | 441 | 389 | 286 |

I claim:

1. A polyethylene terephthalate molding blend comprising
   (a) 20-90% by weight of blend of polyethylene terephthalate having an inherent viscosity of at least 0.4, (b) 0.1–20% by weight of blend of (a) and (b) of at least one sodium and/or potassium salt of a carboxyl containing organic composition selected from the class consisting of hydrocarbon monocarboxylic acids containing 7–25 carbon atoms, hydrocarbon di- or tricarboxylic acids of 7–54 carbon atoms, and an ionic hydrocarbon copolymer derived from an alpha-olefin of 2–5 carbon atoms and an alpha, beta ethylenically unsaturated carboxylic acid of 3–5 carbon atoms.

(c) a halogenated flame retardant consisting of an aromatic organic compound having at least one aromatic ring in which the compound has sufficient halogen bonded directly to aromatic ring carbons to provide flame retardant properties, said flame retardant present in said blend in an amount sufficient to provide an amount of halogen to the blend of between about 5 and 30% by weight based on weight of blend with (a), (d) 0.3–8% by weight of blend with (a) of antimony oxide, said antimony oxide being added to the blend in the form of a concentrate in polyamide wherein the antimony oxide is present in an amount of about 20–80 by weight of the concentrate.

2. The blend of claim 1 wherein component (b) is a sodium or potassium salt of a hydrocarbon di-or tricarboxylic acid of 7–54 carbon atoms present in an amount of 0.1–5% by weight of blend with (a).

3. The blend of claim 1 which contains up to 55% by weight of blend of reinforcing or filling material.

4. The blend of claim 1, wherein component (b) is the ionic hydrocarbon copolymer derived from an alpha-olefin of 2–5 carbon atoms and an alpha, beta-ethylenically unsaturated carboxylic acid of 3–5 carbon atoms.

5. The blend of claim 1 or 2 wherein the halogenated flame retardant is selected from decabromodiphenyl ether, octabromodiphenyl ether, ethylene bis-(tetrabromophthalimide), brominated polystyrene, poly(dibromophenylene oxide), and the corresponding chlorinated compounds.

6. The blend of claim 1 or 2 wherein the blend contains a plasticizer.

7. The blend of claim 1 in pellet form.

* * * * *